(12) United States Patent
Robb et al.

(10) Patent No.: US 7,330,833 B1
(45) Date of Patent: Feb. 12, 2008

(54) SYSTEM AND METHOD FOR AUCTIONING SERVICES OVER AN INFORMATION EXCHANGE NETWORK

(75) Inventors: Richard Robb, New York, NY (US); Thomas Riemer, New York, NY (US)

(73) Assignee: Printvision, Inc., New York, NY (US)

( * ) Notice: Subject to any disclaimer, the term of this patent is extended or adjusted under 35 U.S.C. 154(b) by 0 days.

(21) Appl. No.: 09/677,302

(22) Filed: Sep. 29, 2000

(51) Int. Cl.
*G06Q 40/00* (2006.01)

(52) U.S. Cl. .......................................... 705/37; 705/35

(58) Field of Classification Search ................. 705/37, 705/35
See application file for complete search history.

(56) References Cited

U.S. PATENT DOCUMENTS

| | | | | |
|---|---|---|---|---|
| 3,581,072 | A * | 5/1971 | Nymeyer | 705/37 |
| 4,839,829 | A | 6/1989 | Freedman | |
| 5,136,501 | A | 8/1992 | Silverman et al. | |
| 5,394,324 | A | 2/1995 | Clearwater | |
| 5,640,569 | A * | 6/1997 | Miller et al. | 710/241 |
| 5,664,115 | A | 9/1997 | Fraser | |
| 5,717,989 | A | 2/1998 | Tozzoli et al. | |
| 5,794,207 | A * | 8/1998 | Walker et al. | 705/1 |
| 5,802,502 | A | 9/1998 | Gell et al. | |
| 5,826,244 | A | 10/1998 | Huberman | |
| 5,842,178 | A | 11/1998 | Giovannoli | |
| 5,890,138 | A * | 3/1999 | Godin | 705/26 |
| 5,924,082 | A | 7/1999 | Silverman et al. | |
| 6,012,045 | A * | 1/2000 | Barzilai | 705/37 |
| 6,044,363 | A * | 3/2000 | Mori | 705/37 |
| 6,085,169 | A * | 7/2000 | Walker et al. | 705/26 |
| 6,415,270 | B1 * | 7/2002 | Rackson | 705/37 |
| 6,598,026 | B1 * | 7/2003 | Ojha et al. | 705/26 |
| 6,669,832 | B1 * | 12/2003 | Saito et al. | 705/26 |

* cited by examiner

*Primary Examiner*—Alain L. Bashore
(74) *Attorney, Agent, or Firm*—Liu & Liu

(57) ABSTRACT

A system and method for auctioning services. A rating system is employed to rate the buyer's transaction history, with respect to their frequency of following through with the bids for jobs that they submitted for auction. This rating system deters those buyers that casually shop for pricing with little chance of following through with the auction. A low rating discourages service providers from bidding, thereby decreasing the competitiveness of an auction and increasing the cost of obtaining the service. The buyer follow-through ratings give the bidders a better sense of the buyer's commitment prior to deciding on allocating resources to participate in bidding at the auction. In one embodiment, the system and method for auctioning services are implemented over an information exchange network. In a further aspect, buyers request and specify at the start of the auction the number of lowest bids the buyers would like to see.

18 Claims, 3 Drawing Sheets

SYSTEM AND METHOD FOR AUCTIONING SERVICES OVER AN INFORMATION EXCHANGE NETWORK

BACKGROUND OF THE INVENTION

1. Field of the Invention

The present invention relates to the auctioning of services, particularly to the auctioning of document services, and more particularly to the auctioning of document services over an information exchange network.

2. Description of Related Art

In a market driven economy, one of the expectations that customers have is to obtain the best pricing. Traditionally, suppliers of goods and services establish pricing based on whatever the market would bear, based on the economics of supply and demand. Competition among suppliers tends to drive pricing down to some extent. Competition may be effectively created "on demand" by means of an auction process, for the supply side, the demand side or both. For the supply side, customers can typically obtain the lowest prices from auctioning to the suppliers the goods and services demanded by the customers. Some economists believe that the true market price is established via auctioning.

Traditional auctioning processes are quite effective for transacting goods, for which quality can be determined relatively easily, as compared to services. However, auctioning of services might not be effective to ensure best pricing because of the nature of services. While the lowest price might be obtained from auctioning a service, it might not be the best pricing considering the potential range of quality in the delivery of the services.

Take for example document services, and more specifically printing services. Print jobs are not commodities like office supplies, toys or Treasury bonds. Each print job is unique and each printer is unique. Needless to mention, buyers want the best price taking into consideration of the quality of the job and services of the printers. Traditionally, to obtain the best price on a print job, a buyer needs to shop around for several printers, requiring one-on-one dealing with each prospective printer. Such shopping around for the best price is time-consuming. The buyer's choice of printers is limited to printers that are located within certain geographical boundaries that can be reasonably explored by the buyer within time constraints. The result is an economically inefficient market, in which resource allocation and pricing are sub-optimal.

U.S. Pat. No. 5,826,244 to Huberman (fully incorporated by reference herein) describes a process that relies on the Internet to broker document services. According to the Huberman process, a buyer who needs a particular document services job done can provide a request for these services to an online broker. Service providers can bid competitively on the request by submitting bids to the broker, who awards the job to the lowest bidder. Alternatively, instead of simply picking a winner, the Huberman process offers the buyers a choice of several possible winners, based on, for example, a number of winning bids. The customer can then be given an opportunity to select from among these candidates, or to decline or cancel. It appears that the customers do not preset at the start of the auction the number of winning bids that would be offered to the customers. While the Huberman process improves the efficiency of document services transaction and pricing practices related thereto, its auctioning process has several drawbacks.

While buyers want to encourage printers to compete on price, buyers generally cannot agree to accept the lowest bid. A buyer needs to select the best printer for a requested job based on factors such as the printer's reputation or geographic proximity to the buyer. Not every job and every buyer involves the same tradeoff between price and quality. In some cases, only price matters, but in other cases, jobs may be relatively insensitive to price. By showing the buyers several bids in accordance with the Huberman process, without some control as to the number of bids, the printers realize that they can bid a higher price and may still be able to win the job. Consequently, the Huberman process does not encourage the printers to give their best price while preserving the buyers' ability to select a printer on factors other than price.

Further, buyers do not want to be committed to execute a job at all, while printers want to spend their time bidding on real jobs that actually will happen. The Huberman process allows the buyers to rely on their sole discretion to decline or cancel a print job, but it does not provide sufficient protection for the printers to avoid wasting resources to create an estimate for the print job to bid at the auction which would be eventually declined or cancelled by the buyers. Without some level of comfort for the printers to feel that they are not wasting their time participating in the auction process, some printers may quickly lose interest in the auctioning process. Without sufficient printer participation, auctioning may be less effective in establishing lowest pricing to the buyers. Huberman clearly realized that forcing buyers to execute on a job request would not work, as buyers often need to know the cost before they can decide whether or not to execute. Charging a fee to buyers for posting job requests would eliminate the non-serious buyers, but would also discourage serious buyers from auctioning their jobs. Disclosing the buyer's identity to the printers would allow the printers to avoid the buyers known to "habitually" decline or cancel on the print job, but would also encourage the printers to selectively bid on only the jobs of well-known buyers, thereby negating the intended effect of auctioning. Also, buyers worry that their competitors could guess their business plans if their identities were disclosed. For example, if a buyer auctions a job online to print newspaper inserts, its competitor might guess that it plans a new promotion if its identity were published.

Accordingly, it is desirable to provide an improved auctioning process that will encourage the service providers to give their best prices while preserving the buyers' ability to select a provider based on factors other than price. Further, it is desirable to provide an improved auctioning process that will encourage the service providers to allocate resources to participate in the auctioning process while protecting buyers' confidentiality.

SUMMARY OF THE INVENTION

The present invention is directed to an improved system and method for auctioning services. It overcomes some of the drawbacks in the prior art systems and methods. In accordance with one aspect of the present invention, buyers request and specify at the start of the auction the number of lowest bids the buyers would like to see. Bidding is open and takes place in continuous time, allowing printers to see their competitors' bids. By requesting to see more bids, the buyers would have greater opportunity to evaluate service providers based on factors other than price, thereby encouraging less price competition among providers. By requesting to see fewer bids, the buyers would have less opportunity to evaluate service providers based on factors other than price, thereby encouraging fierce price competition. The number of bids requested by the buyer is made known to the bidders. The net effect is that the buyers can control the price/quality tradeoff at the onset of the auction process, and encourage the bidders to provide their lowest bids when pricing is important. This lets the buyers make their final decision based on factors in addition to price, at the lowest price possible.

In another aspect of the present invention, a rating system is employed to rate the buyer's transaction history, with respect to their frequency of following through with the bids for jobs that they submitted for auction. The buyer's rating is made known to the service provider before the service provider submits a bid. This rating system deters those buyers that casually shop for pricing with little chance of following through with the auction. Buyers who frequently submit jobs without executing them will get a low rating. A low rating discourages service providers from bidding, thereby decreasing the competitiveness of an auction. As a result, low-rated buyers should expect to pay more for the service provided. Consequently, buyers will be discouraged from submitting jobs that have a low chance of occurring. The buyer follow-through rating gives the bidders a better sense of the buyer's commitment prior to deciding on allocating resources to participate in bidding at the auction.

In one embodiment of the present invention, the system and method for auctioning services are implemented over an information exchange network. In a more specific embodiment of the present invention, the information exchange network is the Internet. This facilitates bringing together the many service providers in a centralized auction market using standardized, electronic bid forms to communicate prices publicly, and service providers have a chance to adjust their prices in real time.

For purpose of illustrating the inventive concept, the present invention is described using the example of document services, and more particularly printing services.

DESCRIPTION OF THE ILLUSTRATED EMBODIMENTS

Figure 1:
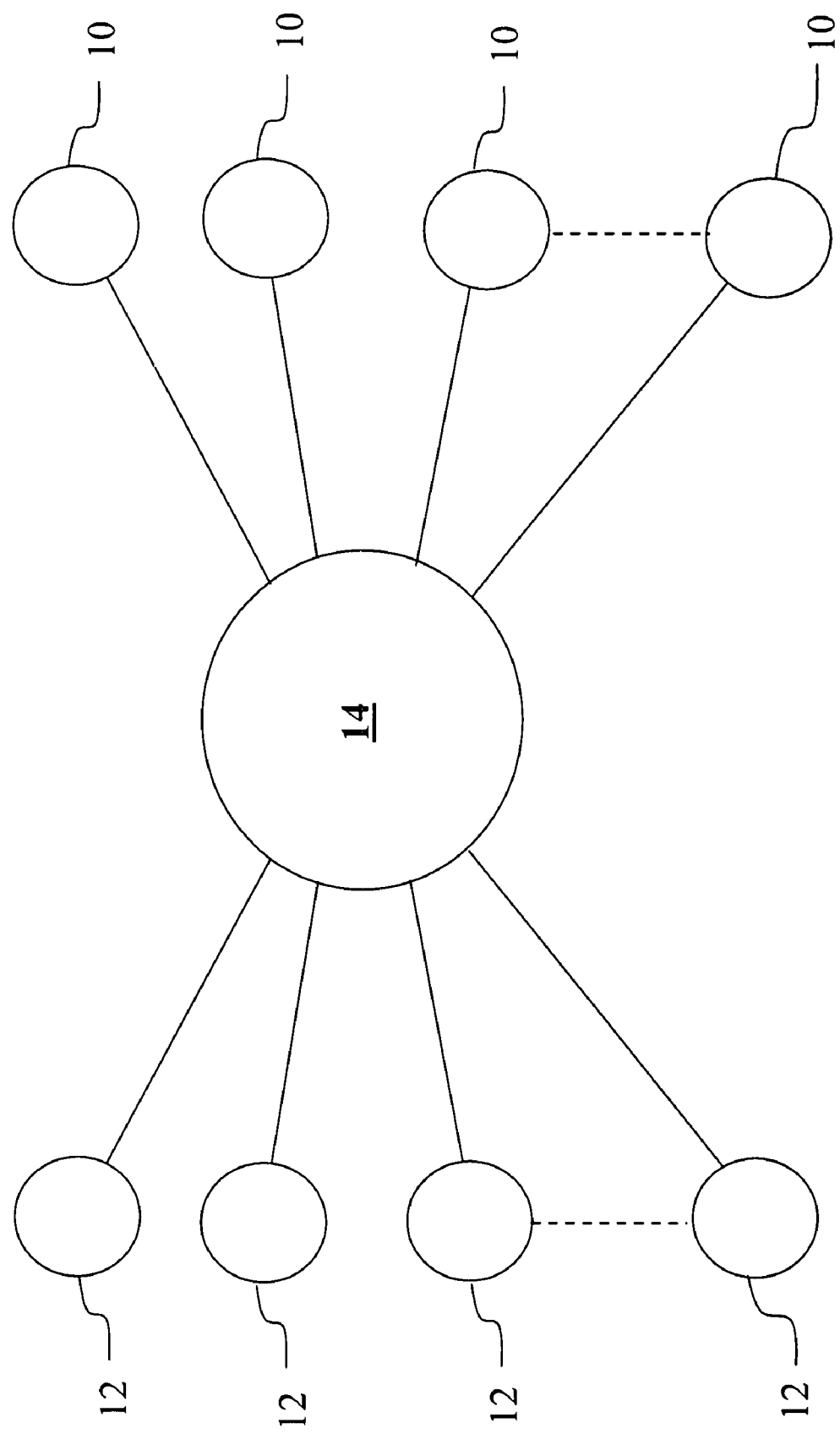
FIG. 1 is a schematic representation of one embodiment of a computer network through which the auctioning process and system of the present invention may be implemented.

The present description is of the best presently contemplated mode of carrying out the invention. This description is made for the purpose of illustrating the general principles of the invention and should not be taken in a limiting sense. The scope of the invention is best determined by reference to the appended claims.

Auctioning of Services

The present invention is directed to auctioning of services. To facilitate an understanding of the principles and features of the present invention, they are explained herein below with reference to its deployments and implementations in illustrative embodiments. By way of example and not limitation, the present invention is described herein below in reference to examples of deployments and implementations for auctioning of document services and, more particularly, printing services in an information exchange environment and, more particularly, in the Internet environment.

The present invention can find utility in a variety of implementations without departing from the scope and spirit of the invention, as will be apparent from an understanding of the principles that underlie the invention. It is understood that the auction concept of the present invention may be applied to auctioning of other services of other nature, for a wide range of service offerings, whether in a information network environment or otherwise. For example, the auctioning scheme of the present invention may be applied to service offerings such as financial services, banking services, subscriptions, entertainment, insurance, news, informational databases, informational services, brokerage services, personal services, health services, legal services, etc., which a buyer may wish to shop for, transact or otherwise access such service offerings online or otherwise.

As used in the context of the present invention, and generally, service providers include any entity that is indirectly or directly presenting service offerings, such as an intermediary (e.g., a shopping portal), a reseller or broker of services or a direct provider of services, including without limitation suppliers, contractors, subcontractors, bidders, merchants, job brokers, and more specifically printers in the context of printing services, and the like. The terms "buyers", "customers", "purchaser", "users" and the like, refer to any seekers of services, and may include without limitation, contractors for subcontracting, resellers or brokers of services, or purchasing agents for end users.

Information Exchange Network

The auctioning platform may involve, without limitation, distributed information exchange networks, such as public and private computer networks (e.g., Internet, Intranet, WAN, LAN, etc.), value-added networks, communications networks (e.g., wired or wireless networks), broadcast networks, and a homogeneous or heterogeneous combination of such networks. As will be appreciated by those skilled in the art, the networks include both hardware and software and can be viewed as either, or both, according to which description is most helpful for a particular purpose. For example, the network can be described as a set of hardware nodes that can be interconnected by a communications facility, or alternatively, as the communications facility, or alternatively, as the communications facility itself with or without the nodes. It will be further appreciated that the line between hardware and software is not always sharp, it being understood by those skilled in the art that such networks and communications facility involve both software and hardware aspects.

A method or process is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Useful devices for performing the operations of the present invention include, but is not limited to, general or specific purpose digital processing and/or computing devices, which devices may be standalone devices or part of a larger system. The devices may be selectively activated or reconfigured by a program, routine and/or a sequence of instructions and/or logic stored in the devices. In short, use of the methods described and suggested herein is not limited to a particular processing configuration. Prior to discussing details of the inventive aspects of the present invention, it is helpful to discuss one example of a network environment in which the present invention may be implemented.

The Internet is an example of an information exchange network including a computer network in which the present invention may be implemented, as illustrated schematically in FIG. 1. Many servers 10 are connected to many clients 12 via Internet network 14, which comprises a large number of connected information networks that act as a coordinated whole. Details of various hardware and software components comprising the Internet network 14 are not shown (such as servers, routers, gateways, etc.) as they are well known in the art. Further, it is understood that access to the Internet by the servers 10 and clients 12 may be via suitable transmission medium, such as coaxial cable, telephone wire, wireless RF links, or the like. Communication between the servers 10 and the clients 12 takes place by means of an established protocol. As will be noted below, the auctioning system of the present invention may be configured in or as one of the servers 10, which may be accessed by buyers and service providers via clients 12.

Figure 2:
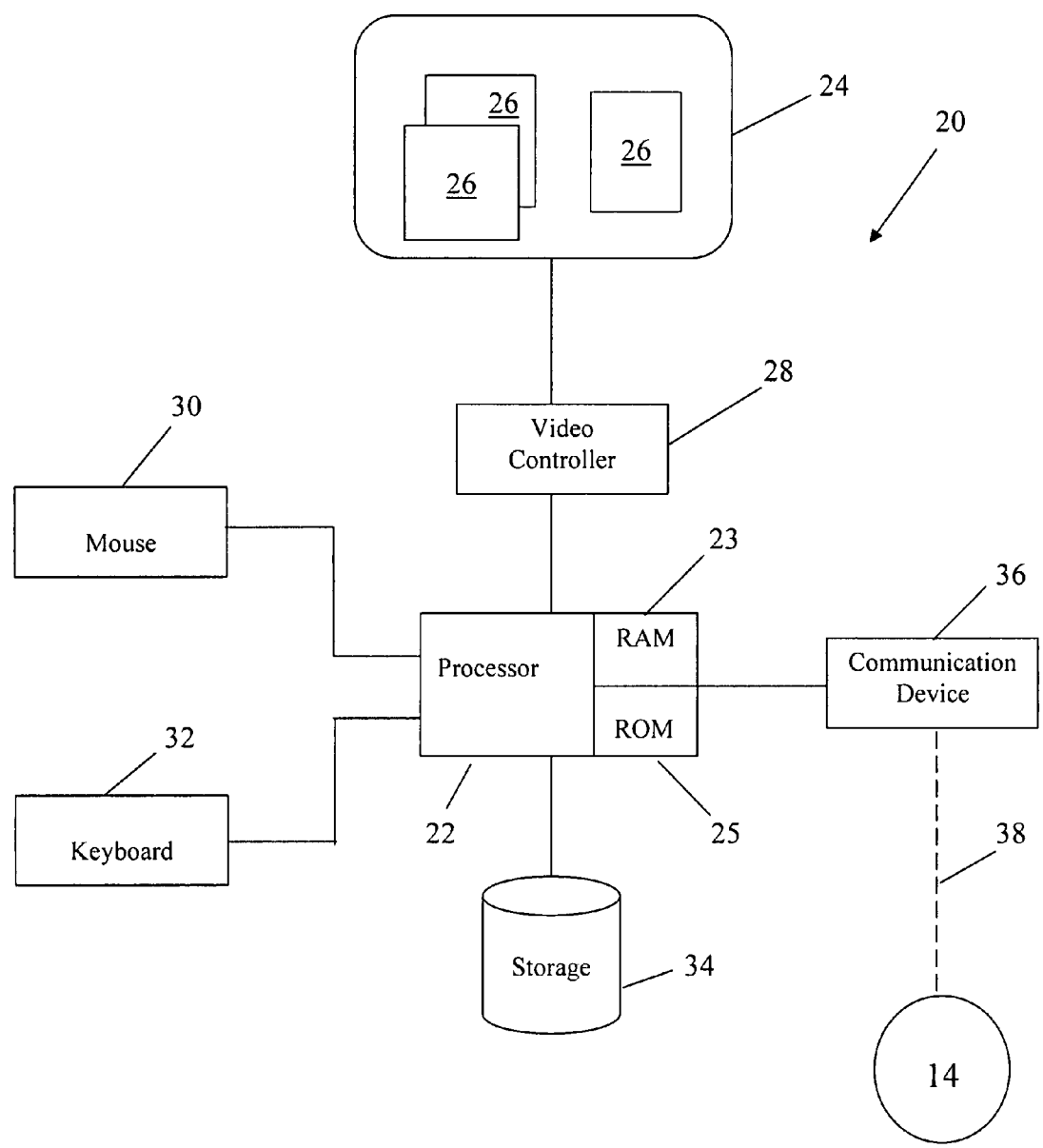
FIG. 2 is a schematic representation of one embodiment of a computer system that facilitates the auctioning process of the present invention.

Turning now to FIG. 2, there is schematically illustrated one embodiment of a computer system 20 which may be configured as the client 12 for navigating the Internet. The computer system 20 communicates with the Internet network 14. The computer system 20 includes a processor 22, internal random-access memory ("RAM") 23 and read-only memory ("ROM") 25, and a data bus architecture for coupling the processor 22 to various internal and external components. The computer system 20 further includes a communication device 36 which, in turn, is coupled to a communication channel 38 for effecting communication with the Internet network 14. A mass storage device 34, such as a hard disk drive or floppy disk drive or CD-ROM drive, is coupled to the processor 22 for storing utility and application software (including a suitable web browser for navigating the Internet) and other data. The application software is executed or performed by the processor 22.

Input devices controlled by the user are also coupled to the processor 22, including a cursor positioning device 30 and a keyboard 32 in accordance with the present invention. The cursor positioning device 30 is representative of any number of input devices that produce signals corresponding to a cursor location on the display 24, and may include by way of example, a mouse, a trackball, an electronic pen, or a touch-pad, which may be an integral part of the keyboard 32. A display 24 is coupled to the processor 22 through a video controller 28. The video controller 28 coordinates the presentation of information on the display 24 in one or more windows 26. Generally, the windows 26 are scalable, thus permitting a user to define the size and location of a particular window 26 on the display 24.

The server 10 could also have similar components as the computer system 20 depicted in FIG. 2. The program configuration of the client 12 and server 10 would be apparent given the disclosure of the desired functions of the client 12 and server 10 disclosed hereinbelow.

Basic online processes are well known in the art.

The present invention may also be implemented by modifying the configuration of the system and process disclosed in U.S. Pat. No. 5,826,244 to Huberman, which is fully incorporated by reference herein, to include the novel functions and features of the present invention disclosed herein. It is submitted that the modified system and process as a whole is inventive over Huberman.

Document Services

By way of example and not limitation, the service auctioning aspect of the present invention is discussed in reference to document services. Document services can include, for example, printing, copying, scanning, interpretation, text and image recognition, editing, reproduction, binding, colorization, transmission (e.g., by facsimile or by electronic mail), mailing, storage (e.g., in microphotographic or digital form), retrieval, format conversion, authentication, searching (e.g., within a document or in a data base of documents), shredding, recycling, disposal, and many others. The document service industry has its unique characteristics and requirements for both the service providers and buyers of the services.

By way of example and not limitation, the present invention is discussed using the example of printing services. Each print job is unique and each printer is unique. It is estimated that there are 58,000 printers and millions of commercial print buyers in the United States. The present invention brings the printers together with the buyers in a centralized auction market using standardized, electronic bid forms to communicate.

Electronic Auction Broker

Figure 3:
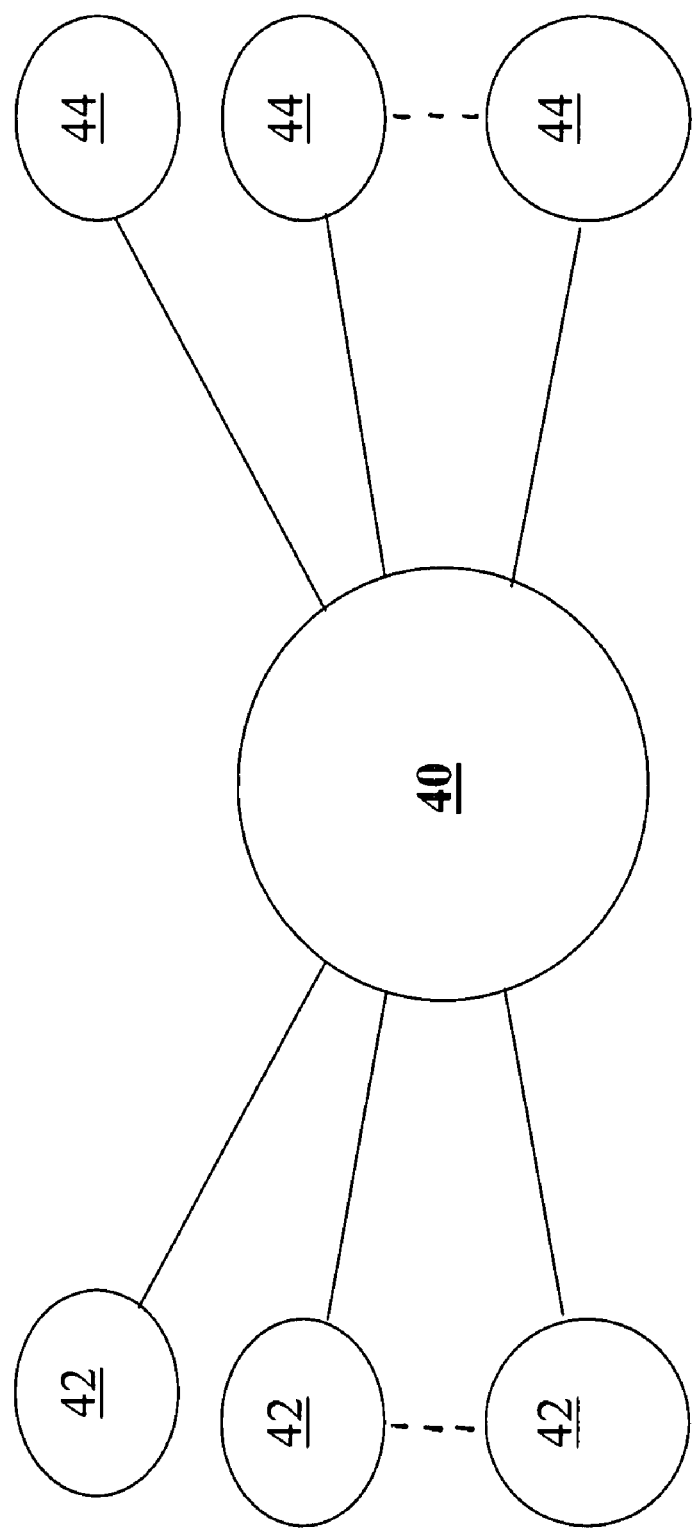
FIG. 3 is a schematic representation of the interaction of the auction broker, printers and buyers in accordance with the present invention.

Referring to FIG. 3, the auctioning of print services is handled automatically, without substantial user intervention, by an electronic broker having processes operating at a web site 40 to which buyers 42 and printers 44 can access to undertake the auctioning process. The web site 40 may be hosted at a server 10 (FIG. 1). The buyers 42 and printers 44 may access the web site 40 via the Internet using clients 10 (FIG. 1). When a buyer 42 has a print job that she wishes to submit for auction, it logon to the broker's web site 40 and input a job profile or job specification, including specification, requirements, parameters and information such as:

Job name job description auction type (the best number of bids, to be explained below)

date and time auction closes delivery date geographical limitation to printers that are located within certain miles from the buyer job type (e.g., sheet feed, magazine, book, envelope, advertisement inserts, etc.)

whether job is repeatable pre-press requirements, such as finished size; number of pages; artwork specification (camera ready, disk supplied, film output only, composing film, color separation, etc.); total number of separations and number of separations by size; proofs requirements, etc.

press requirements, such as quantities; versions or changes; unders and overs; stock specification (coated/uncoated, texture, grade, weight, etc.); type of alternate stock permitted; source of stock (printer, buyer or other); ink specification (color, varnish, etc.)

finishing and bindery requirements, such as coatings; film and adhesives specification (UV, film lamination, scratch off); folding, cutting, binding and finishing specification (folding, perfing, scoring, diecutting, binding, drilling, padding embossing, foil stamping, etc.)

delivery/mailing requirements, such as ink jet (locations, number of lines, number of sides, etc., mailing options); packing specifications (cartoon options, bulk handling options, etc); delivery requirements (terms, method, etc.)

additional comments on the job (buyer's name, descriptive terms, etc.)

To assist the buyer in entering the job profile, there is provided a user friendly menu driven input interface or an on-screen template with drag-down options for appropriate parameters. The designs of such interface and template are well within the skill in the art, given the function and features of the desired design described herein. The interface may define a standardized bid form to facilitate communications between buyers and printers. The web site 40 may be structured and configured to allow the buyer to modify a submitted, active print job, and/or to create a job profile based on a previous job.

The broker may include facilities to store the profiles of the printers and buyers for future use, such as user identification, company name and contact information, account information, custom setup and preferences, etc.

Features of the Auctioning Process a. General

Printers logon to the web site 40 to browse the print jobs that are still in open auctions. Alternatively, the broker may be configured to notify printers by e-mail about jobs. Printers may bid on one or more of the available print jobs by transmitting to the web site 40 their bids during auction term. The printers may download the specification of the job and apply a cost estimating system that has been customized to handle the format of the specification automatically. The buyers can only see their own print jobs, and limited information about the jobs of other buyers. Each bid in each auction is assigned a number, and the bid price is displayed by the broker, which is viewable by both all printers and the buyer. No one can see which printer entered a bid, not even the printer's identification number. When the auction ends, the broker releases the identity (e.g., names and contact information) of the N winning bidders (i.e., the N lowest bids, as specified by the buyer; see discussion below) to the buyer. The buyer chooses whether or not he is willing to let the broker reveal his name to winning printers. It is up to the buyer to contact the printers (e.g., electronically) to finalize the transaction with one of the winning printers on the list. The buyer would notify (e.g., electronically) the broker of the outcome.

Buyers may be permitted to cancel their auctions, even though they are not committed in the first place to executing jobs at the end of their auctions. It would benefit the printers (e.g., to consider re-allocating resources reserved for handling the potential print job) if they are notified of such cancellation when buyers change their minds.

In return for conducting the print job auction, the broker may require compensation from the printers and/or buyers. For example, the broker may require a commission of a certain percentage of the price of each print job that the printers receive by bidding at auctions conducted by the broker. Further, because the broker is essentially referring printers and buyers to each other, the broker may require a commission for each subsequent run of previous print jobs or new print jobs that the printers receive directly from the buyers outside of the auctions (i.e., print job resulting from direct requests by the buyers instead of auctioning). The buyers and/or printers may be required to notify the broker of each subsequent print job, with the penalty of losing the privilege of using the broker's auctioning services in the future.

The settlement of payment for services as between the buyers and printers may be handled independently between the parties, or through the services of the broker. The buyers and/or printers may set up accounts with the broker, so that the financial settlement of the transactions can be handled electronically. The payment of commission from the printers to the broker may be handled by electronically debiting the printers' accounts with the broker. These and other settlement methods known in the e-commerce field may be adopted without departing from the scope and spirit of the present invention. Alternatively, traditional paper invoicing processes may be adopted.

In another embodiment of the present invention, the number of printers eligible to bid on an auction is limited. For example, in "private label" auctions, the buyer specifies an approved set of printers that are eligible to bid. This may happen when the buyer can only work with pre-approved suppliers, for example, under a government contract. In this embodiment, the printers know the identity of the buyer.

b. N Best Bids

In accordance with one aspect of the present invention, buyers request and specify at the start of the auction the number N of lowest bids the buyers would like to see. By requesting to see more bids, the buyers would have greater opportunity to evaluate printers based on factors other than price, thereby encouraging less price competition among providers. Buyers may consider factors such as the reputation, location, prior dealings, and other factors concerning the printers. If the broker allows for the printers to post comments in their bids, buyers may take into consideration the printers' comments as well. By requesting to see fewer bids, the buyers would have less opportunity to evaluate printers based on factors other than price, thereby encouraging fierce price competition. The number N is made known to the bidders by the broker, by displaying it with the job profile of the posted print job. As the printers bid for a particular job, the broker continuously display the best N bids at the web site 40.

If the buyer is highly price sensitive, she selects a low value for N. For example, by choosing 'Best Bid Only' (i.e., N=1), the buyer gets to see the price from the printer with the lowest bid. This lets the printers know that the buyer wants to see fierce price competition. This forces every printer to give its best price. In the other extreme, where the buyer chooses a very large value of N, the auction turns into a conventional request for bids, except that the broker displays the prices publicly. For example, by choosing 'All Bids' (i.e., N=unlimited), the buyer gets to see the best bid from every printer. The buyer would have more flexibility to choose from a number of printers. The net effect of the buyer specifying the N parameter is that the buyer can control the price/quality tradeoff at the onset of the auction process, and encourage the bidders to provide their lowest bids at every level of flexibility (i.e., number of potential printers) specified by the buyer. This lets the buyers make their final decision on factors in addition to price, at the lowest price possible. It is proposed that an N=3 provides a balanced result of lowest pricing and options for the buyer in many situations.

The broker may set one or more preset values and/or default values of N for the buyers to select as they input the job specification. To maintain the integrity of the process, buyers are not allowed to see the N+1 best bid.

c. Bidding Rules

To enhance the auctioning process, the electronic broker may be structured and configured with certain additional bidding rules to promote price competition. For example, the printers may be permitted to bid any amount as long as the printer does not beat an outstanding bid by less than a predetermined percentage, for example 1%. The rationale behind this rule is that if a printer takes the initiative to bid $100,000, for example, on a job, it would not be fair for another printer to jump in front of that printer with a bid of $99,999.

Using the example of 1%, the following bidding scenarios are illustrative of the operation of this rule:

A) Buyer is willing to evaluate 3 bids (N=3)
There is one outstanding bid: $10,000
Next bid can be at $9,900 or less, or at $10,001 or higher.
B) Buyer is willing to evaluate 3 bids (N=3)
There are two outstanding bids: $10,000 and $10,100
Next bid can be at $9,900 or less, or at $10,101 or higher.
C) Buyer is willing to evaluate 3 bids (N=3)
There are three outstanding bids: $10,000, $10,100, $10,500
Next bid can be at $9,900 or less, or at $10,101 to $10,395. The next bid could be over $10,500 but there would be little point; the bid would only make the final cut in the unlikely event that one of the top three contenders eventually drop out.

The printers may be permitted to change their bids. In the spirit of auctions, printers can submit lower bids. The new bid simply replaces the old bid. If a printer wants to raise the amount of an original bid, the printer has to cancel the original bid and start over.

The printers may cancel bids during an auction. However, printers are not allowed to enter and cancel bids as part of a bidding strategy. For example, the printer is not allowed to enter a very low bid to discourage other printers, cancel the low bid at the last minute, then enter a higher bid. The electronic broker may be structured and configured to detect this bidding behavior and may cancel the printer's access.

Buyers frequently want to know the price of a job for more than one quantity of finished pieces they may wish to print depending on the price differential. Each quantity will be handled as a separate auction from the printers' perspective. Each auction may result in a different winner. To increase the chance of winning a bid from a particular buyer who submitted jobs of different quantities, the printers would bid on all the separate auctions.

d. Buyers' Follow-Through Ratings

In another aspect of the present invention, a rating system is employed to rate the buyer's transaction history, with respect to their frequency of following through with the bids for jobs that they submitted for auction. The broker does not wish to be treated as a free estimating service for buyers, but a forum for auctioning jobs that have a realistic chance of taking place. Nevertheless, everyone realizes that buyers will sometimes bid out a job and then decide not to execute it. This might happen because the bids are higher than the buyers expected or simply because the buyer's needs changed. The rating is made available to the printers (e.g., online at the web site 40) for each job submitted for auction. The rating lets printers know how often the buyers followed through in the past. It lets printers make their own decision about how much time to invest in bidding on a buyer's job.

This also has a deterrent effect on "casual" buyers. Buyers who frequently submit jobs without executing them will get a low rating. A low rating discourages printers from bidding, resulting in less competitive auctions and higher costs for the service. Consequently, buyers will be reluctant or discouraged to submit for auctioning jobs that have a low chance of occurring, because it affects their rating for future auctions.

A buyer's rating consists of two numbers: the number of jobs completed and the number of jobs submitted by the particular buyer. For example, 7/12 means that a buyer has submitted 12 jobs to the broker in the past, and that buyer followed through on 7 of them. For purpose of this rating, a job may count as executed as soon as the buyer selects a printer and informs the broker that the buyer agreed with that printer to execute the job. A job may count as submitted either after a certain, predetermined number of days after the auction ends or when the buyer selects a printer. One job with multiple quantities only counts as one submission.

The rating may be deceptively high for buyers who only execute low priced or small jobs. In addition to the rating, the broker may be configured to maintain a record of the buyer's transaction history. The history may be made available to the printers (e.g., online at the web site 40). The history allows the printers to have another perspective of the ratings. For example, the history shows the date and size of jobs the particular buyer submitted and the outcome of each auction. This data allows the printers to detect buyers who have high ratings but who only execute small jobs.

The process and system of the present invention has been described above in terms of functional modules in block diagram format. It is understood that unless otherwise stated to the contrary herein, one or more functions may be integrated in a single physical device or a software module in a software product, or a function may be implemented in separate physical devices or software modules, without departing from the scope and spirit of the present invention.

It is appreciated that detailed discussion of the actual implementation of each module is not necessary for an enabling understanding of the invention. The actual implementation is well within the routine skill of a programmer and system engineer, given the disclosure herein of the system attributes, functionality and inter-relationship of the various functional modules in the system. A person skilled in the art, applying ordinary skill can practice the present invention without undue experimentation. Further, reference may be made to U.S. Pat. No. 5,826,244 to Huberman, which had been incorporated by reference herein, for further guidance on the steps of electronic auctioning in general, which can be modified to include the features and functions of the present invention described above.

While the invention has been described with respect to the described embodiments in accordance therewith, it will be apparent to those skilled in the art that various modifications and improvements may be made without departing from the scope and spirit of the invention. For example, the auctioning process can be easily modified to accommodate the situation in which buyers are bidding to purchase services sold by a provider, in which case the service provider would specify the N best bids (i.e., the highest bids).

Accordingly, it is to be understood that the invention is not to be limited by the specific illustrated embodiments, but only by the scope of the appended claims.

The invention claimed is:

1. A computer implemented process for auctioning services requested by a buyer via a network, comprising the steps of:

submitting by the buyer via the network a service request to a broker for auctioning;

making available via the network by the broker to potential bidders a buyer rating, wherein said rating includes information on the buyer's follow-through of bids in prior auctions, wherein the potential bidders are sellers of services; and considering by the potential bidders the rating in deciding on whether to bid on the service request, wherein the higher the rating, the more willing the potential bidders would want to bid, and the lower the rating, the less willing the potential bidders would want to bid.

2. A process as in claim 1, wherein the rating includes the number of service requests completed with respect to the number of service requests submitted in prior auctions.

3. A process as in claim 1, wherein the service request is for printing services.

4. A process as in claim 1, wherein the broker is an electronic broker operating at a node in an information exchange network.

5. A process as in claim 4, wherein the information exchange network is the Internet.

6. An apparatus for auctioning services requested by a buyer, comprising:
   means for receiving from the buyer a service request for auctioning;
   means for making available to potential bidders a buyer rating, wherein said rating includes information on the buyer's follow-through of bids in prior auctions, wherein the potential bidders consider the rating in deciding on whether to bid on the service request, wherein the higher the rating, the more willing the potential bidders would want to bid, and the lower the rating, the less willing the potential bidders would want to bid, wherein the potential bidders are sellers of services; and
   means for receiving bids from the bidders.

7. An apparatus as in claim 6, wherein the rating includes the number of service requests completed with respect to the number of service requests submitted in prior auctions.

8. An apparatus as in claim 6, wherein the service request is for printing services.

9. An apparatus as in claim 6, further comprising means to communicate with an information exchange network, wherein the buyer and the bidders communicates with the broker system via the information exchange network.

10. An apparatus as in claim 9, wherein the information exchange network is the Internet.

11. A network system for auctioning services, comprising:
    one or more nodes for buyers to access the network;
    one or more nodes for bidders to access the network, wherein the bidders are seller of services; and
    a broker system for auctioning services requested by a buyer, comprising:
      means for receiving from the buyer a service request for auctioning;
      means for making available to potential bidders a buyer rating, wherein said rating includes information on the buyer's follow-through of bids in prior auctions, wherein the potential bidders consider the rating in deciding on whether to bid on the service request, wherein the higher the rating, the more willing the potential bidders would want to bid, and the lower the rating, the less willing the potential bidders would want to bid; and
      means for receiving bids from the bidders.

12. A process as in claim 1, further comprising the steps of:
    specifying by the buyer via the network at the start of an auction a number N of best bids to be considered from the auction, where N is a number less than number of all bids, and predetermined by the buyer based on tradeoff between price competition among bidders (at a smaller N value) and number of bidders available for buyer selection of a bidder based on factors other than price (at a larger N value);
    making by the broker the number N available to bidders via the network;
    notifying via the network by the broker the buyer of the identities of the N lowest bids; and
    selecting by the buyer via the network a bidder from one of the N lowest bids or choosing not to execute the service request.

13. A process as in claim 12, wherein the broker does not allow the buyer to consider any bids greater than the $N^{th}$ bid.

14. A process as in claim 12, wherein the bidders can bid any amount as long as they beat an outstanding bid by more than a predetermined amount.

15. An apparatus as in claim 6, further comprising:
    means for the buyer to submit a service request to a broker for auctioning;
    means for the buyer to specify at the start of an auction the number N of best bids to be considered from the auction, where N is a number less than number of all bids, and predetermined by the buyer based on tradeoff between price competition among bidders (at a smaller N value) and number of bidders available for buyer selection of a bidder based on factors other than price (at a larger N value);
    means for the broker to make N available to bidders; and
    means for the buyer to select a bidder from one of the N best bids.

16. An apparatus as in claim 15, wherein the broker is configured such that it does not allow the buyer to consider any bids greater than the $N^{th}$ bid.

17. An apparatus as in claim 15, wherein the broker is configured such that the bidders can bid any amount as long as they beat an outstanding bid by more than a predetermined amount.

18. A network system as in claim 11, wherein the broker system further comprising:
    means for the buyer to submit a service request to a broker for auctioning;
    means for the buyer to specify at the start of an auction a number N of best bids to be considered from the auction, where N is a number less than number of all bids, and predetermined by the buyer based on tradeoff between price competition among bidders (at a smaller N value) and number of bidders available for buyer selection of a bidder based on factors other than price (at a larger N value);
    means for the broker to make N available to bidders; and
    means for the buyer to select a bidder from one of the N best bids.

* * * * *